United States Patent
Lux

[11] 4,077,419
[45] Mar. 7, 1978

[54] AWNING APPARATUS FOR TRAVEL TRAILERS, MOBILE HOMES, AND THE LIKE

[76] Inventor: Phil Lux, 54369 Susquehanna Ct., Elkhart, Ind. 46514

[21] Appl. No.: 587,212

[22] Filed: Jun. 16, 1975

[51] Int. Cl.² ............................................. E04F 10/06
[52] U.S. Cl. .................................. 135/5 AT; 160/66; 160/68; 248/273; 248/357
[58] Field of Search ............ 135/5 AT; 248/273, 357; 160/66–82; 242/107.6, 107.7

[56] References Cited

U.S. PATENT DOCUMENTS

| | | | |
|---|---|---|---|
| 1,576,840 | 3/1926 | Meyer | 40/85 |
| 2,189,525 | 2/1940 | Treffeisen | 248/273 |
| 2,287,667 | 6/1942 | Brown | 248/273 |
| 2,339,344 | 1/1944 | Markle | 248/273 |
| 3,866,874 | 2/1975 | Upton, Jr. | 160/72 X |
| 3,923,074 | 12/1975 | McKee | 135/5 AT |

FOREIGN PATENT DOCUMENTS

| | | | |
|---|---|---|---|
| 2,027,369 | 8/1969 | Germany | 160/68 |

*Primary Examiner*—Werner H. Schroeder
*Assistant Examiner*—Conrad L. Berman
*Attorney, Agent, or Firm*—Craig & Antonelli

[57] ABSTRACT

Awning apparatus for travel trailers, mobile homes, and the like for canopy awnings of the type having a canopy attached at a fixed rail on the vehicle and at a wind-up roller bar. The roller bar includes springs for asserting wind-up tension on the canopy at all times such that movement of the roller bar from the canopy in-use position spaced from the vehicle to a storage position adjacent the vehicle is accompanied by an automatic wind-up of the canopy around the roller bar. A four point suspension system is provided for supporting the roller bar which includes side arms engageable with respective opposite ends of the roller bar and rafter arms engageable with the roller bar at positions intermediate the ends of the roller bar. To accommodate adjustment and connection of the rafter bars, the roller bar is provided with a slot engageable with an enlarged ball end portion of the rafter bars. The rafter bars are pivotally connected at the vehicle at a position adjacent the in-use storage position of the side arm bars. At the mounting rail on the vehicle, saddle brackets are provided for cradling opposite end portions of the roller bar when in the storage position, which saddle bars include a detent bulge engageable in radially facing recesses on the roller bar to automatically prevent rotation of the roller bar when it is clamped in the storage position forced downwardly against the saddle bar. The roller bar is provided with removable end caps for accommodating access to the internal wind-up springs, which end caps include slots in alignment with slots in the roller bar for accommodating exchange of the canopy without requiring removal of the end caps.

17 Claims, 12 Drawing Figures

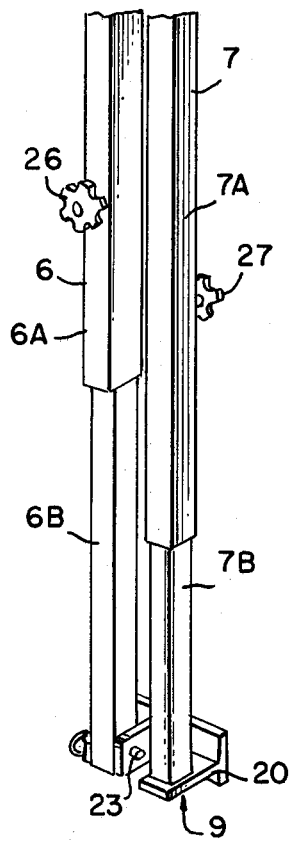
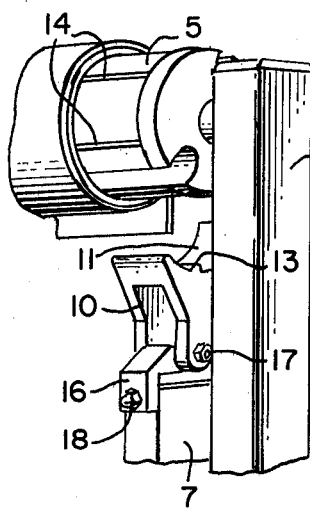
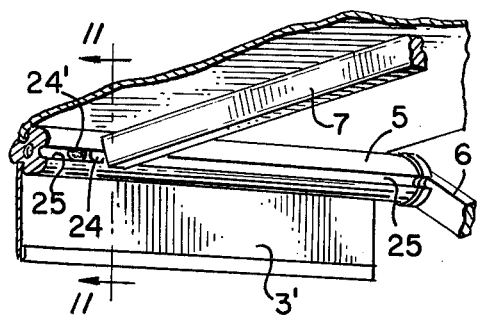
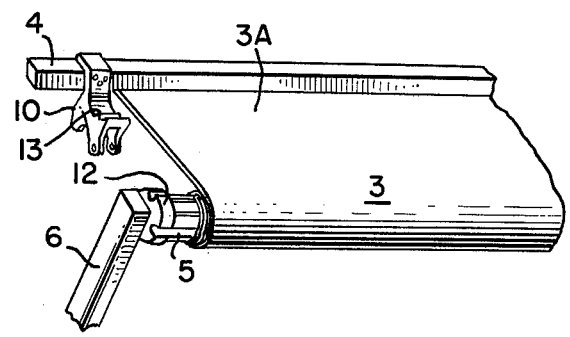
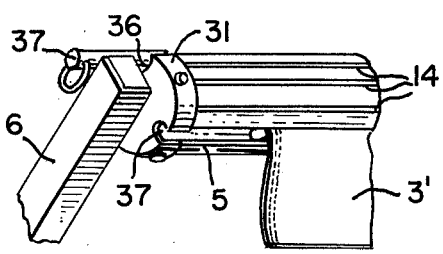
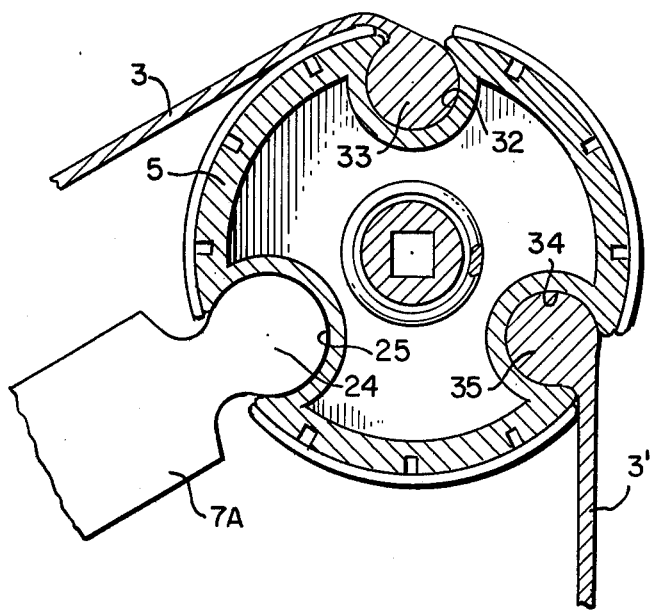
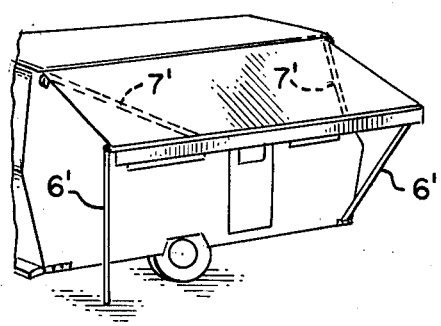

AWNING APPARATUS FOR TRAVEL TRAILERS, MOBILE HOMES, AND THE LIKE

BACKGROUND AND SUMMARY OF THE INVENTION

The present invention is related to awning apparatus for travel trailers, mobile homes, and the like. The present invention is more particularly related to improvements in canopy awnings of the type which include a spring loaded roller bar attached to one end of a sheet of canopy material, which sheet has the other end attached to a fixed canopy rail at the vehicle or other structure. Such a canopy awning is disclosed in U.S. Pat. No. 3,324,869.

Although prior art arrangements such as exemplified by the above-noted U.S. patent, provide for respective in-use and storage positions of the canopy, such prior art arrangements exhibit disadvantages with respect to complexity of construction, difficulty of operation and assembly, and minimization of wind caused billowing effects on the canopy when the vehicle is moved with the canopy in a storage position. The present invention contemplates various improvements for overcoming the above-noted disadvantages of the prior art arrangements. These improvements, operating alone, and in conjunction with one another, result in a simple, economical canopy construction that is easy to operate and assemble and which avoids wind billow effects during travel in a simple, economical, reliable manner.

A first improvement contemplated by the present invention relates to the holddown assembly for holding the roller bar in the storage canopy wind-up position. The present invention contemplates providing at least one saddle bracket member attachable to the vehicle structure, which saddle bracket includes a cradle portion for cradling the roller bar when in a storage position. The cradle portion and radially outwardly facing peripheral portions of the roller bar include respective interengageable detent means for automatically preventing relative rotation of the saddle bracket and the roller bar when the roller bar is cradled in the cradle portion. With this construction, billowing of the canopy means is positively limited because unwinding of the roller cannot take place. The simple construction of the interengaging detents on the cradle portion of the saddle bracket and the roller bar provides for a very economical and reliable construction. Further, this construction avoids the necessity of additional clamping means for the roller, since side arm members attached to the end of the roller for supporting it in the in-use position can be adjusted to effectively clamp the roller bar downwardly into the cradle portion when in the storage position.

Another improvement contemplated by the present invention relates to the arrangement for supporting the roller bar in the in-use canopy extended position. More specifically, the present invention contemplates the inclusion of at least one side arm member having one end thereof attached to an end of the roller bar means and the other end thereof engageable with either the ground or the vehicle structure so as to support the roller bar in the vertical direction. Although it is generally known to support the roller bar by side arm members engaging the ends of the roller bar, for example see the above-noted U.S. Pat. No. 3,324,869, the present invention further contemplates the combination with such support of at least one rafter arm member engageable at the vehicle structure and at the roller member, wherein the rafter arm member engages the roller member at a position spaced from the ends thereof so as to provide additional points of support, with consequent reduction in the tendency of the roller bar to sag, especially when loaded such as when it is raining or the like. By engaging the roller member at a position several feet from the ends thereof, the rafter arm members provide a much firmer support than would be the case if the rafter members engaged the ends of the roller member. A particularly preferred embodiment of the invention includes a side arm at each of the opposite ends of the roller and a pair of rafter arm members engageable intermediate the ends of the roller member with a resultant four point support of the roller member. To accommodate the simple transformation of the canopy between canopy in-use and canopy storage positions, the rafter arm members are pivotally attached at a U-bracket adjacent the saddle brackets so that they can be easily moved from the in-use position and pivoted to be in alignment with the side arm members for storage purposes.

A further improvement of the present invention relates to the provision of a bottom bracket attached to the vehicle below the saddle and U-brackets, which bottom bracket detachably supports the lower ends of the respective side arm members and rafter arm members when in the stored position. For this purpose, the bottom bracket includes a socket for engaging a ball end portion of the rafter arm member, which ball arm member also is slidably engaged in a slot of the roller member when in the in-use canopy position.

Another improvement of the present invention relates to the construction of the roller bar itself, so as to accommodate ready exchange of the canopy fabric without any disassembly of the roller bar. This improvement includes the provision of end caps for the roller bar which are removable to accommodate exchange and/or repair of the wind-up springs in the roller bar, which end caps are provided with slots, said slots being aligned with corresponding slots in the periphery of the roller bar for accommodating installation and removal of canopy fabric by the mere insertion and/or extraction of a canopy bead into the aligned slots in a direction parallel to the axis of rotation of the roller bar.

In particularly preferred embodiments of the invention, a main canopy slot is provided in the roller bar for the main canopy, which main canopy is also attached at the vehicle. An additional canopy slot is provided in the roller bar circumferentially spaced from the main canopy slot for accommodating a visor canopy which hangs downwardly when the canopy is in an in-use position with the main canopy extending with a slight inclination downwardly from the vehicle in the outwardly direction.

These and other objects, features, and advantages of the present invention will become more apparent from the following description thereof, when taken in connection with the accompanying drawings.

BRIEF DESCRIPTION OF THE DRAWINGS

FIG. 6 is an enlarged partial schematic view taken from FIG. 2 and depicting the lower portion of a side arm member and rafter arm member in the storage position;

FIG. 7 is an enlarged perspective view depicting the cooperation of the upper bracket assembly during transition between canopy in-use and canopy storage positions;

FIG. 8 is a perspective view of an upper corner portion of the awning apparatus of FIGS. 1 and 2;

FIG. 9 is a bottom perspective view of a portion of the canopy apparatus of FIG. 1 which depicts the attachment of the rafter arm member to the roller bar;

FIG. 10 is a front perspective view of one end of the front bar which depicts the arrangement of a side arm member and locking pin for preventing rotation of the roller bar when in the in-use position of FIG. 1;

FIG. 11 is a sectional view of the roller arm member taken along line XI—XI of FIG. 9; and FIG. 12 is a perspective schematic view of another embodiment of the present invention, which view depicts the alternative connection of the side arm members at the ground or the lower bracket at the vehicle.

DETAILED DESCRIPTION OF THE PREFERRED EMBODIMENTS

Figure 1:
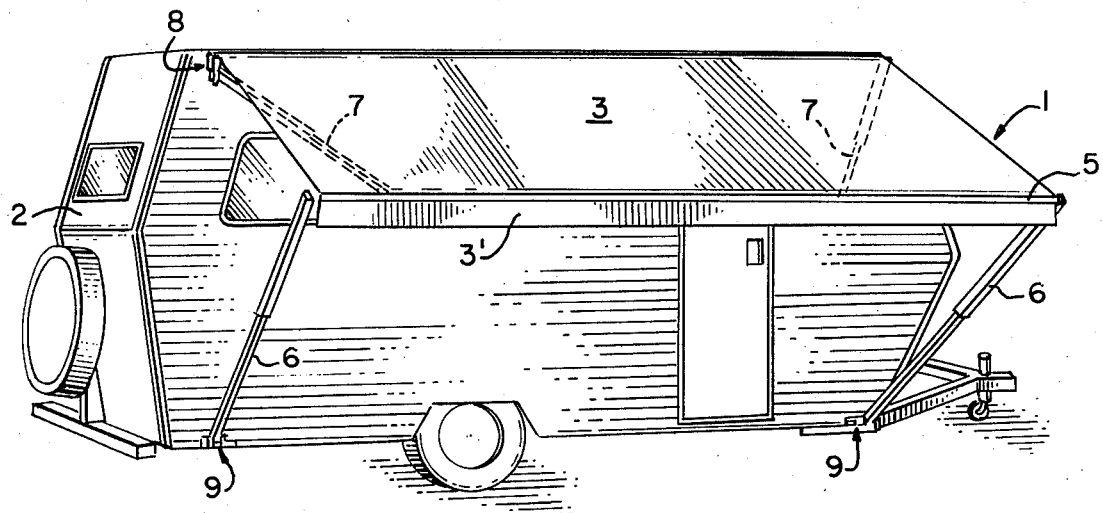
FIG. 1 is a perspective view showing a preferred embodiment of the awning apparatus of the present invention, with the canopy awning in an in-use position.

Referring now to the drawings, wherein like reference numerals are used throughout the Figures to designate like structure, and more particularly to FIG. 1, the canopy awning apparatus 1 is shown attached to a recreational trailer vehicle 2. The canopy awning includes a main canopy cloth 3 which is attached at one edge thereof to an awning rail 4 (FIG. 8) at the vehicle 2 and at the other opposite edge thereof to a roller bar 5. As described more fully below, this roller bar 5 includes internal spring members which continuously apply a rotational force to wind the main canopy 3 around the roller bar 5. Side arm members 6 and rafter arm members 7 (shown in dashed lines in FIG. 1) serve for supporting the roller bar 5 in the canopy in-use position of FIG. 1.

Figure 2:
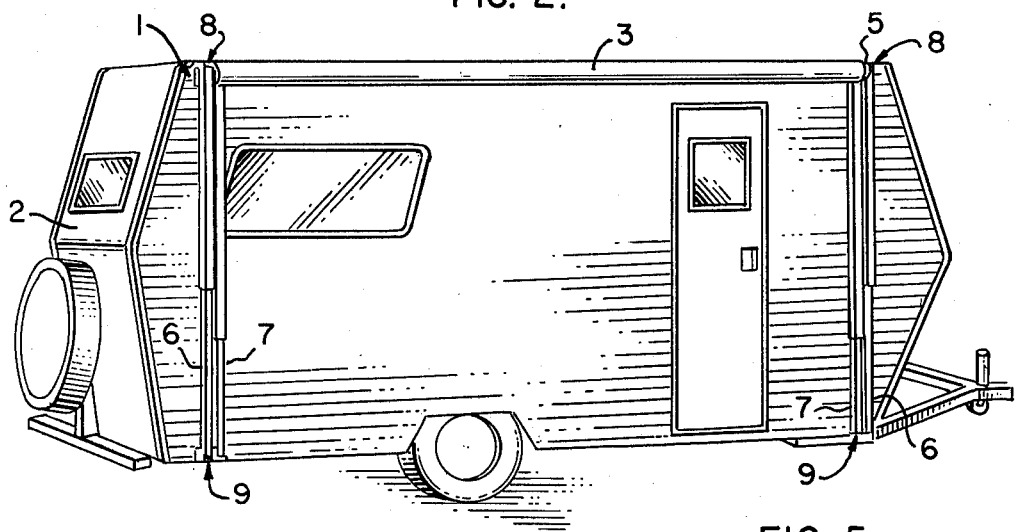
FIG. 2 is a view similar to FIG. 1 except that the canopy awning is in a storage travel position on the vehicle.

To accommodate reliable support of the side arm members 6 and rafter arm members 7, which also accommodates ease of assembly and ease of operation in moving the canopy apparatus between the in-use position depicted in FIG. 1 and the storage position depicted in FIG. 2, special upper bracket assemblies 8 and lower bracket assemblies 9 are provided at respective opposite ends of the canopy structure.

Figure 3:
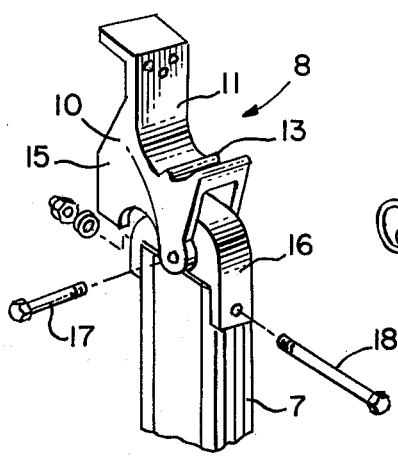
FIG. 3 is a perspective, partially exploded view depicting an upper bracket assembly of the present invention.

FIG. 3 shows details of the upper bracket assembly 8, which includes a saddle bracket 10 which is attachable by screws to the awning rail 4 (see FIG. 8). This saddle bracket 10 includes a cradle portion 11 within which the end portions 12 of the roller bar 5 are cradlingly supported when the canopy is in the storage position of FIG. 2. An upwardly protruding detent bulge 13 extends longitudinally of the cradle portion 11 and is formed integrally with the saddle bracket 10. This cradle portion 13 is dimensioned to lockingly engage in peripheral slots 14 of the roller bar such that when the roller bar is nested in the cradle portion 11 and held downwardly by adjustment and locking of the side arm member 6 to the lower bracket assembly 9, rotation of the roller bar is positively prevented. The base portion 15 of the bracket 10 is dimensioned in the direction laterally of the vehicle such as to assure a spacing of the rolled up canopy on the roller 5 from the side of the vehicle, which spacing assures that no rubbing of the rolled up canopy against the vehicle takes place during transportation phases and also assures that the roller member 5 can be rolled to a tightly wound condition simultaneously with the interlocking of bulge 13 and one of the slots or grooves 14 of the roller bar.

The upper bracket assembly further includes a U-bracket 16 which is pivotally connected to the saddle bracket 10 by way of pivot pin or bolt 17. This U-bracket 16 accommodates pivotal connection of rafter arm member 7 by way of pivot pin or bolt 18. With this pivotal connection by way of U-bracket 16, the rafter arm member 7 can be readily manipulated between the storage position of FIG. 2 to the in-use position of FIG. 7. That is, the pivotal connection at the U-bracket 16, in conjunction with the pivotal arrangement of the U-bracket at the fixedly attached saddle bracket 10, accommodates the desired and required movement between the respective in-use and storage positions.

Figure 4:
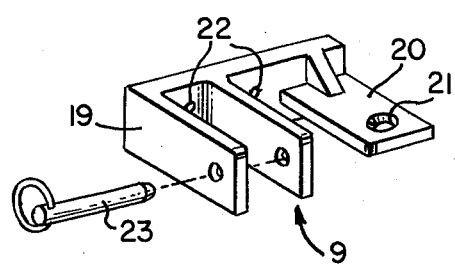
FIG. 4 is a schematic perspective view depicting a lower bracket assembly constructed according to the present invention.

The lower bracket assembly 9, best illustrated in FIG. 4, includes a horizontal U-shaped section 19 and a baseplate 20 with baseplate socket 21. This bracket assembly 9 is fixedly attached by screw means extended through screw holes 22 to the vehicle 2. When the canopy apparatus is in the storage position of FIG. 2, the lower bracket assembly fixedly holds the lower end of the side arm member 6 by way of pivot pin 23, with the side arm member bounded by the U-shaped bracket portion 19. With the rafter 7 in the storage position, it is maneuvered to a vertical position in substantially parallel relationship to the stored side arm member 6 and is lockingly engaged with the socket 21 of baseplate bracket 20 by way of ball portion 24 (see FIG. 11 for details of the ball portion 24 which also serves alternatively to engage in a groove 25 against rubber stop member 24' in the roller member 5 when in the in-use position as depicted in FIGS. 1 and 9). It will be understood that the pivot pin 23 accommodates pivotal movement of the side arm member 6 between the in-use position of FIG. 1 and the storage position of FIG. 2. Also, this pivot pin 23 is readily detachable so as to accommodate placement of the side arm member directly on the ground as depicted on the lefthand side of the embodiment illustrated in FIG. 12.

Referring now to FIG. 6, each of the side arm members 6 include an upper portion 6A and a lower portion 6B telescopingly slidable with respect to one another and a threaded manually operable locking member 26 for locking the member 6A and 6B in respective adjusted positions. In a like manner, each of the rafter arm members 7 include telescoping parts 7A and 7B, as well as locking knob 27. With this arrangement of the telescoping side arm members and rafter arm members, length adjustments can be easily made for accommodating switching between in-use and storage positions. For example, as best illustrated in FIG. 7, in order to accommodate placement of the roller bar in the cradle portion 11 of the saddle bracket 10, the locking knob 26 is loosened so that the roller bar can be lifted above and over the front lip portion of the saddle bracket 10. Once the roller bar 5 is nested in the cradle portion 11 of the saddle bar 10 with the grooves 14 and bulge portion 13 in locking engagement with one another, the locking knob 26 is then tightened so as to prevent the roller bar from jumping out of the saddle bracket.

The length adjustment of the rafter arm 7 accommodates any length differences required for the storage and in-use positions, as well as provides for the forceful locking of the ball portion 24 in the lower bracket socket 21 when in the storage position. It is also contemplated by the invention to provide scale means on the lower member portion 6B and 7B so that the length adjustment can be readily made. For example, in setting up the awning, once a desired proper height adjustment has been maintained for one of the side arm members 6A, corresponding height adjustment can be made at the side arm member 6 at the other end of the roller member, without the necessity of additional leveling means and the like, assuming a level orientation of the vehicle. To accommodate tightening of the wind-up springs in the roller 5, an end plug 28 is provided, which end plug 28 can be rotated relative to the outside of roll member 5 to vary the spring tension. In preferred embodiments, two separate wind-up springs are provided in the roller 5, with adjustment of the respective springs being made by respective end plugs 28 at opposite ends of the roller bar member 5. Each of the end plugs 28 include a downwardly protruding portion 29 which telescopingly engages the upper part 6A of side arm members 6 and a screw-threadingly locked into place by setscrews 30.

In order to accommodate access to the inside of the roller bar member 5 for repair and/or replacement of the spring mechanism, roller bar end caps 31 are provided at respective opposite ends of the roller bar 5. These end caps 31 are detachably connected to the member 5 by screws or the like. For attaching the main canopy 3 to the roller bar member 5, a slot 32 is provided along the length of the roller bar member 5. The main canopy 3 is inserted from one end or the other of the roller bar member 5 with the bead 33 of the canopy 3 being slid laterally into the slot, this bead 33 being larger than the smallest outward dimension of the slot so as to prevent pulling out of the canopy from the roller member in the direction circumferentially or radially of the roller member. In a like manner an auxiliary slot 34 is also provided in the roller member 5 for accommodating attachment of the skirt canopy 3' with its bead 35. For accommodating exchange of the main and skirt canopies without removal of the end caps 31, each of the end caps 31 are provided with respective slots 36 and 37 aligned with roller bar slots 32 and 34.

In order to accommodate rotational locking of the roller bar member 5 in the extended in-use position, a locking pin 37 is provided which is sized to engage in the main canopy slots 36, 32 and abuttingly engage the side arm member 6, as best shown in FIG. 10.

The main canopy 3 includes a section 3A which serves as a travel cover during transport of the vehicle with the canopy apparatus in the storage position of FIG. 1.

The connection of the rafter member end ball 24 at the slot 25 of the roller member is best shown in FIGS. 9 and 11.

The assembly of the awning apparatus of the present invention on a vehicle structure of the like should be readily understood from the above detailed description.

Once the awning apparatus is assembled at a vehicle or other structure, the operation thereof is as follows.

Figure 5:
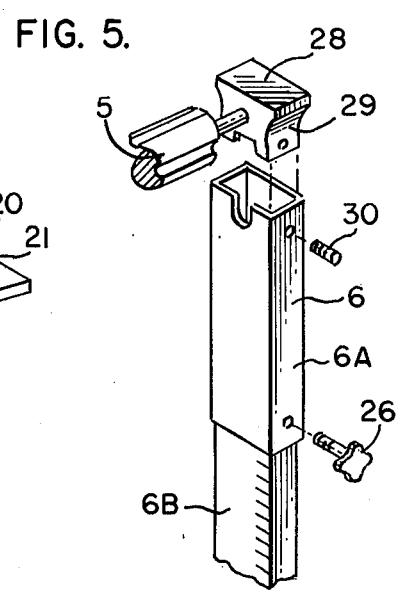
FIG. 5 is a schematic perspective view depicting connection of the roller bar and side arm according to the present invention.

Assuming the apparatus to be in the storage position of FIG. 2 and it is desired to set up for the canopy in-use position of FIG. 1. First loosen the side arm locking knobs 26 and lift the rolled up awning and roller 5 out of the saddle brackets 10 to a position several inches above the saddle brackets. In order to assure that the roller bar always clears the saddle bracket when moving back to the storage position, it is advisable to note the extension of the side arms required for such purpose. The scale is shown in FIG. 5 (as lines on member 6B) on one side for purposes of ease of illustration. In practice, this scale is preferably at the opposite side of member 6B for ease of viewing. Tighten the locking knobs 26 to hold in position and pull out and downwardly on the side arms until the main canopy 3 is fully extended. Then secure the front roller bar 5 in place by inserting the locking retainer pin 38 in the main fabric slot 36, 32. Now loosen the side arm locking knobs 26 and raise the awning to the desired height by pulling up and out on the side arms. Then loosen the rafter arm locking knobs 27 and lift the end ball 24 out of the lower bracket socket 21. Remove retainer pin 37 and insert rafter ball 24 in slot 25 of the roller bar. Now apply slight pressure on the side arm 6 to keep the awning canopy from rolling up. Slide the rafter ball 24 toward the center and push firmly against rubber stop 24' provided to create tension. Then tighten the locking knobs while tension is on the roller bar. The awning apparatus is now ready for use. The above described operation is merely reversed for moving to the storage and/or travel position.

As an additional precautionary measure, embodiments of the invention are also contemplated wherein locking straps are provided which are attached at upper and lower sides of the roller bar when in the storage position, and which include a belt type tightable strap engageable with the roller bar and wind-up canopy assembly.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

I claim:

1. Awning apparatus comprising:
    roller bar means of a canopy awning of the type wherein the canopy means is wound around the roller bar means when in a storage position, said holding means including means for selectively holding said roller bar means in respective in-use and storage positions, and roller bar holding means for holding said roller bar means,
    said holding means including saddle bracket means attachable to relatively fixed support means, said saddle bracket means including a cradle portion for cradling said roller bar means when in said storage position, said cradle portion and the radially facing periphery of said roller bar means including respective interengageable detent means for automatically preventing relative rotation of said saddle bracket means and roller bar means when said roller bar means is cradled in said cradle portion, whereby billowing of said canopy means is limited, wherein said holding means further includes side arm means and rafter arm means, said side arm means including a side arm member having one end thereof attachable to an end of said roller bar means and the other end thereof attachable to relatively fixed structure, said rafter arm means including a rafter arm member having one end attachable to said fixed structure and the other end thereof detachably attachable to said roller bar means, said other end of said rafter arm means being attachable to said roller bar means at a position intermediate the ends of the roller bar means and intermediate the places occupied by the lateral edges of the canopy means when the canopy means is attached to said roller bar means in a canopy in-use position.

2. Awning apparatus according to claim 1, wherein said detent means includes a raised bulge on said cradle portion and a groove on said roller bar means.

3. Awning apparatus according to claim 1, wherein said side arm means includes two of said side arm means attachable at respective opposite ends of said roller bar means, and wherein said rafter arm means includes two of said rafter arm members attachable to said roller bar means at positions spaced from one another, p1 whereby a four point support of said roller bar means is obtained by said side arm means and rafter arm means.

4. Awning apparatus according to claim 1, wherein a pivotally mounted bracket member is provided for pivotally attaching said one end of said rafter arm member to said relatively fixed structure.

5. Awning apparatus according to claim 4, wherein said bracket member is a U-bracket which is pivotally attached to said saddle bracket, said one end of said rafter arm member being pivotally supported intermediate legs of the U-bracket.

6. Awning apparatus comprising:
roller bar holding means for holding a roller bar means of a canopy awning of the type wherein the canopy means is wound around the roller bar means when in a storage position, said holding means including means for selectively holding said roller bar means in respective in-use and storage positions,
said holding means including saddle bracket means attachable to relatively fixed support means, said saddle bracket means including a cradle portion for cradling said roller bar means when in said storage position, said cradle portion and the radially facing periphery of said roller bar means including respective interengageable detent means for automatically preventing relative rotation of said saddle bracket means and roller bar means when said roller bar means is cradled in said cradle portion, whereby billowing of said canopy means is limited further comprising:
fixed support means in the form of a travel trailer, mobile home, or the like,
roller bar means,
and canopy means having one side thereof attached to said fixed support means and the other side thereof attached to said roller bar means, said fixed support means including an awning rail for accommodating attachment of said one side of said canopy means, said saddle bracket means being fixedly attached to said fixed support means at said rail means, wherein said holding means further includes side arm means and rafter arm means, said side arm means including a side arm member having one end thereof attached to an end of said roller bar means and the other end thereof attached to said fixed support means, said rafter arm means including a rafter arm member having one end attached to said fixed support means and the other end thereof detachably attachable to said roller bar means, said other end of said rafter arm member being attachable to said roller bar means at a position intermediate the ends of the roller bar means and intermediate the places occupied by the lateral edges of the canopy means when the canopy means is attached to said roller bar means in a canopy in-use position.

7. Awning apparatus according to claim 6, wherein said holding means further includes a lower bracket means attached to said fixed support means at a position below said saddle bracket means,
said lower bracket means including means for pivotally attaching said other end of said side arm means to said fixed support means and means for locking said other end of said rafter arm member to said fixed support means when said canopy means and roller bar means is in a storage position, whereby said rafter arm member and said side arm member can be stored in side-by-side parallel relationship.

8. Awning apparatus according to claim 6, wherein said side arm means includes two of said side arm members attached at respective opposite ends of said roller bar means,
and wherein said rafter arm means includes two of said rafter arm members attachable to said roller bar means at positions spaced from one another,
whereby a four point support of said roller bar means is obtained by said side arm means and rafter arm means.

9. Awning apparatus according to claim 6, wherein a pivotally mounted bracket member is provided for pivotally attaching said one end of said rafter arm member to said relatively fixed structure.

10. Awning apparatus according to claim 9, wherein said bracket member is a U-bracket which is pivotally attached to said saddle bracket, said one end of said rafter arm member being pivotally supported intermediate legs of the U-bracket.

11. Awning apparatus comprising holding means for holding a roller bar means of a canopy awning of the type wherein the canopy means is wound around the roller bar means when in a storage position, said holding means including means for selectively holding said roller bar means in respective canopy in-use and storage positions, said holding means including side arm means and rafter arm means, said side arm means including a side arm member having one end thereof attachable to an end of said roller bar means and the other end thereof attachable to a relatively fixed structure, said rafter arm means including a rafter arm member having one end attachable to said relatively fixed structure and the other end thereof detachably attachable to said roller bar means, said other end of said rafter arm member being attachable to said roller bar means at a position intermediate the ends of the roller bar means and intermediate the places occupied by the lateral edges of the canopy means when the canopy means is attached to said roller bar means in a canopy in-use position.

12. Awning apparatus according to claim 11, further comprising a roller bar means having a roller bar member with a rafter member accommodating slot on the periphery thereof, said other end of said rafter arm member including an enlarged head portion engageable in said rafter member accommodating slot.

13. Awning apparatus according to claim 11, further comprising:
fixed support means in the form of a travel trailer, mobile home, or the like,
roller bar means,
and canopy means having one side thereof attached to said fixed support means and the other side thereof attached to said roller bar means,
wherein said rafter arm means includes two of said rafter arm members attachable to said roller bar means at positions spaced from one another,
and whereby a four point support of said roller bar means is obtained by said side arm means and rafter arm means.

14. Awning apparatus according to claim 13, wherein each of said side arm members and rafter arm members are formed as relatively rigid two part telescopingly length adjustable members.

15. Awning apparatus according to claim 13, wherein said roller bar means includes a roller bar member with a rafter member accommodating slot extending along the periphery thereof, said other ends of said rafter arm members including respective enlarged head portions engageable in said rafter member accommodating slot.

16. Awning apparatus according to claim 11, further comprising a roller bar means which includes a roller bar member and roll-up spring means inside said roller bar member for automatically turning said roller bar member to effect winding of said canopy means therearound,
wherein a detachable end cap is provided at at least one end of said roller bar member for accommodating changing and repair of said spring means, and wherein both said end cap and said roller bar include radially outwardly facing slots for accommodating exchange of said canopy means without removal of the end cap means by sliding a bead of said canopy means into said slots in a direction parallel to the axis of rotation of the roller bar member.

17. Awning apparatus according to claim 16, wherein said roll-up spring means includes a pair of independent springs which are adjustable by rotation of respective members at opposite ends of the roller bar member, and wherein a detachable end cap with said slots is provided at each end of said roller bar member.

* * * * *